No. 660,422. Patented Oct. 23, 1900.
J. S. FRANCIS.
CAR TRUCK.
(Application filed May 18, 1899.)
(No Model.)
7 Sheets—Sheet 1.

Witnesses
L. C. Hills.
Karl H. Butler.

Inventor
John S. Francis,
By W. A. Redmond
Attorney.

No. 660,422. Patented Oct. 23, 1900.
J. S. FRANCIS.
CAR TRUCK.
(Application filed May 18, 1899.)
(No Model.) 7 Sheets—Sheet 2.
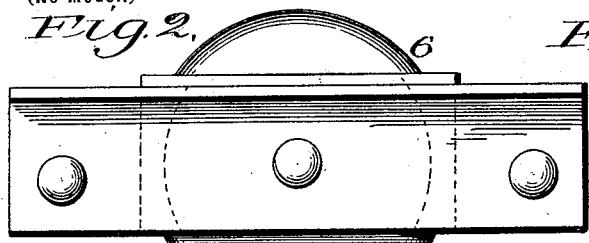
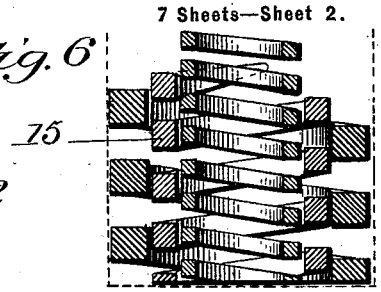
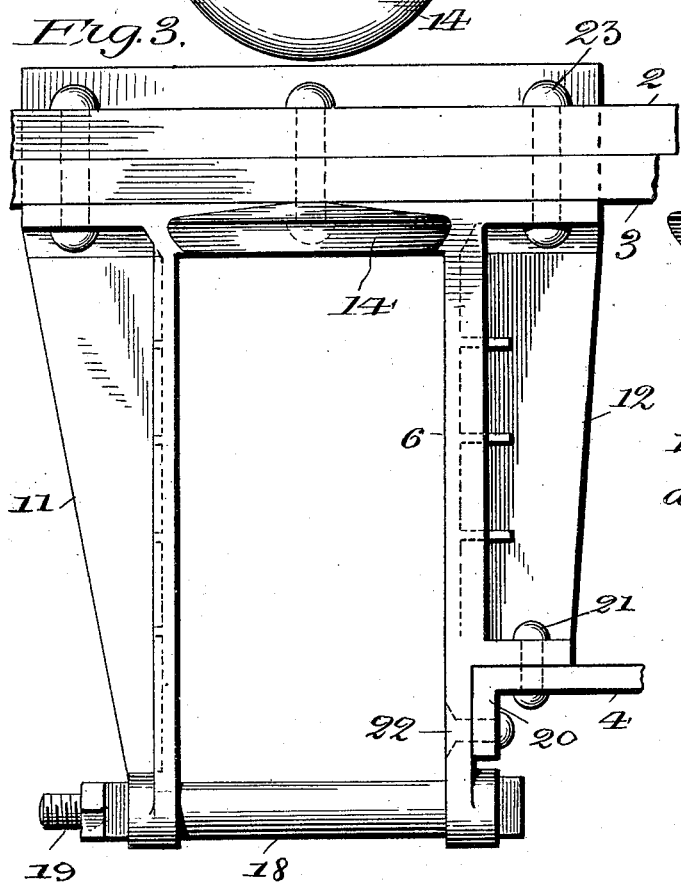
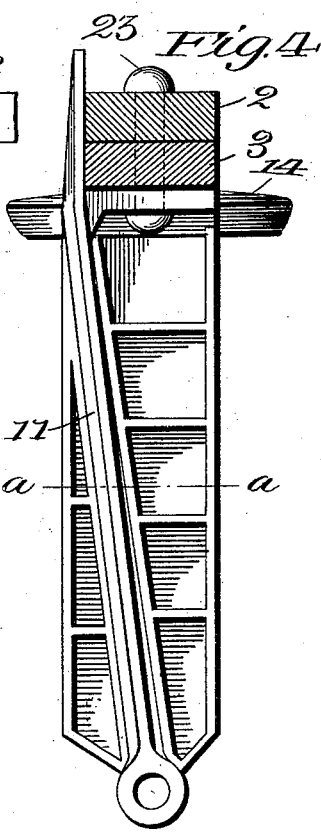
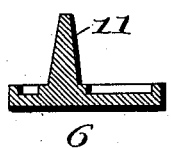
WITNESSES:
L. C. Hills.
F. H. Butler.
INVENTOR
John S. Francis
BY
W. A. Redmond
ATTORNEY.

No. 660,422.
J. S. FRANCIS.
CAR TRUCK.
(Application filed May 18, 1899.)
Patented Oct. 23, 1900.
(No Model.)
7 Sheets—Sheet 3.
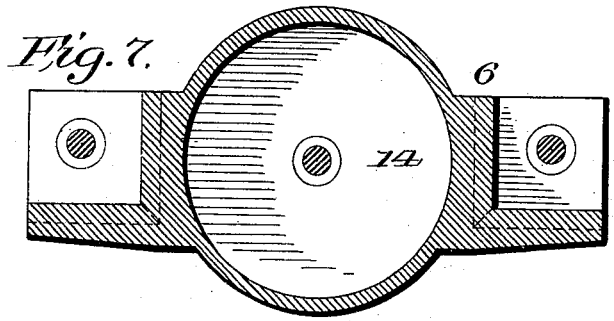
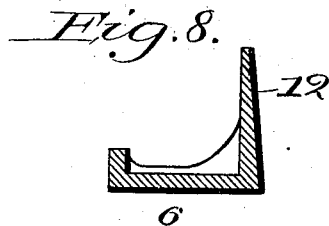
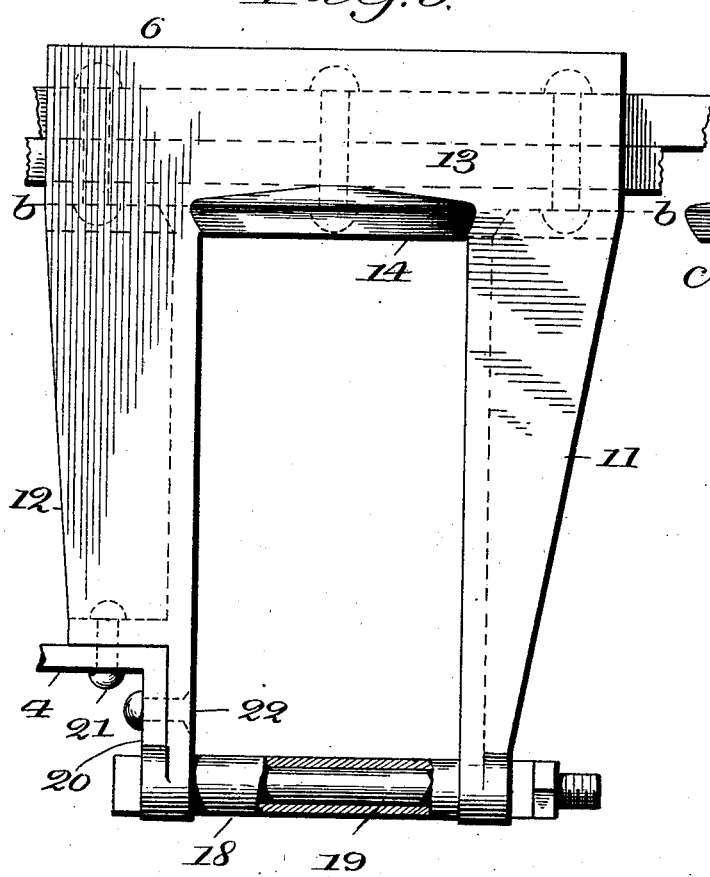
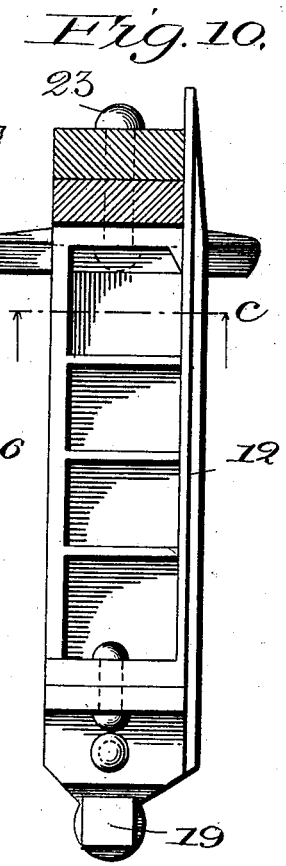
WITNESSES:
L. C. Hills
L. H. Butler
INVENTOR
John S. Francis,
BY
W. A. Redmond
ATTORNEY.

No. 660,422. Patented Oct. 23, 1900.
J. S. FRANCIS.
CAR TRUCK.
(Application filed May 18, 1899.)
(No Model.) 7 Sheets—Sheet 4.
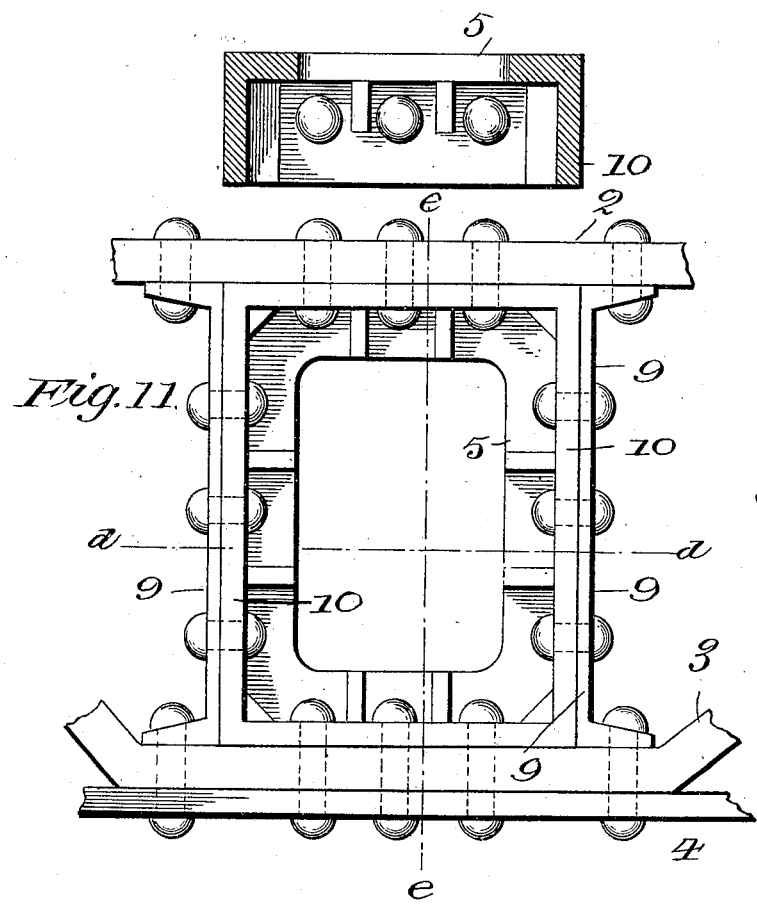
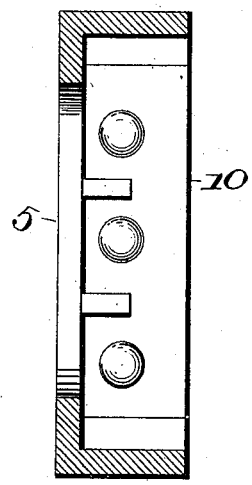
WITNESSES:
INVENTOR
John S. Francis
BY
ATTORNEY.

No. 660,422. Patented Oct. 23, 1900.
J. S. FRANCIS.
CAR TRUCK.
(Application filed May 18, 1899.)

(No Model.) 7 Sheets—Sheet 5.

WITNESSES:
L. C. Hills

INVENTOR:
John S. Francis,
by W. A. Redmond
ATTORNEY

No. 660,422. Patented Oct. 23, 1900.
J. S. FRANCIS.
CAR TRUCK.
(Application filed May 18, 1899.)
(No Model.) 7 Sheets—Sheet 6.

WITNESSES:
L. C. Hills.

INVENTOR
John S. Francis
BY

ATTORNEY.

THE NORRIS PETERS CO., PHOTO-LITHO., WASHINGTON, D. C.

No. 660,422. Patented Oct. 23, 1900.
J. S. FRANCIS.
CAR TRUCK.
(Application filed May 18, 1899.)
(No Model.)
7 Sheets—Sheet 7.
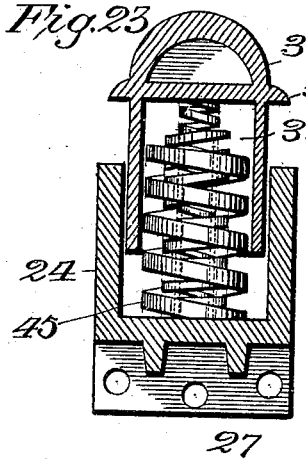
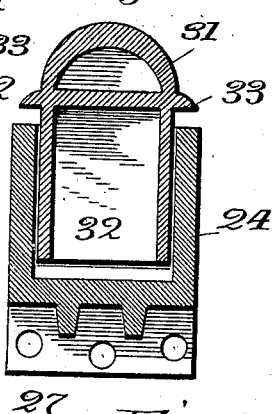
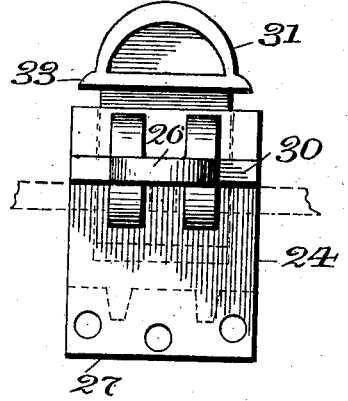
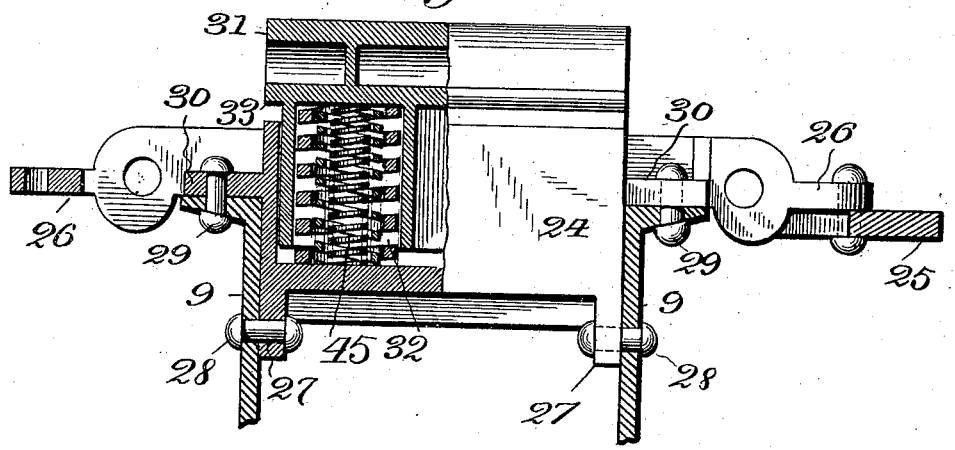
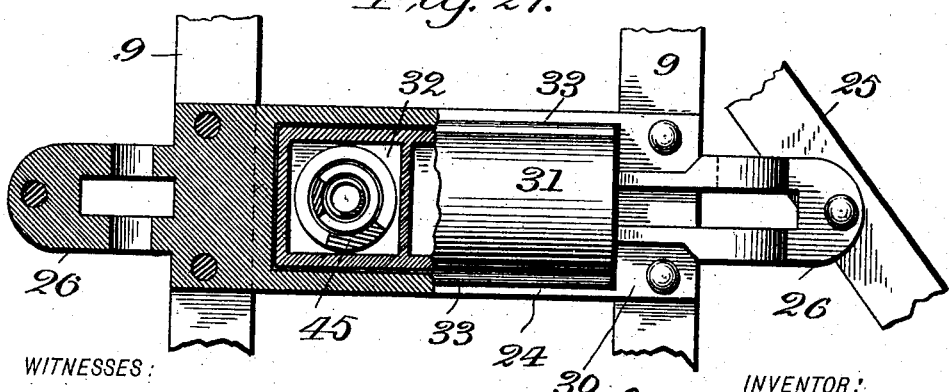
WITNESSES:
INVENTOR:
John S. Francis,
by W A Redmond
ATTORNEY.

UNITED STATES PATENT OFFICE.

JOHN S. FRANCIS, OF BLOOMINGTON, ILLINOIS.

CAR-TRUCK.

SPECIFICATION forming part of Letters Patent No. 660,422, dated October 23, 1900.

Application filed May 18, 1899. Serial No. 717,315. (No model.)

*To all whom it may concern:*

Be it known that I, JOHN S. FRANCIS, a citizen of the United States, residing at Bloomington, in the county of McLean and State of Illinois, have invented certain new and useful Improvements in Car-Trucks; and I do declare the following to be a full, clear, and exact description of the invention, such as will enable others skilled in the art to which it appertains to make and use the same.

This invention relates to car-trucks; and it has for its object to provide a simple, durable, and comparatively inexpensive truck entirely of metal, the parts of which being of such shape that they can be replaced when necessary by similar parts that can be readily found in the open market; and it consists of the parts and combinations of parts hereinafter described and claimed.

Figure 1:
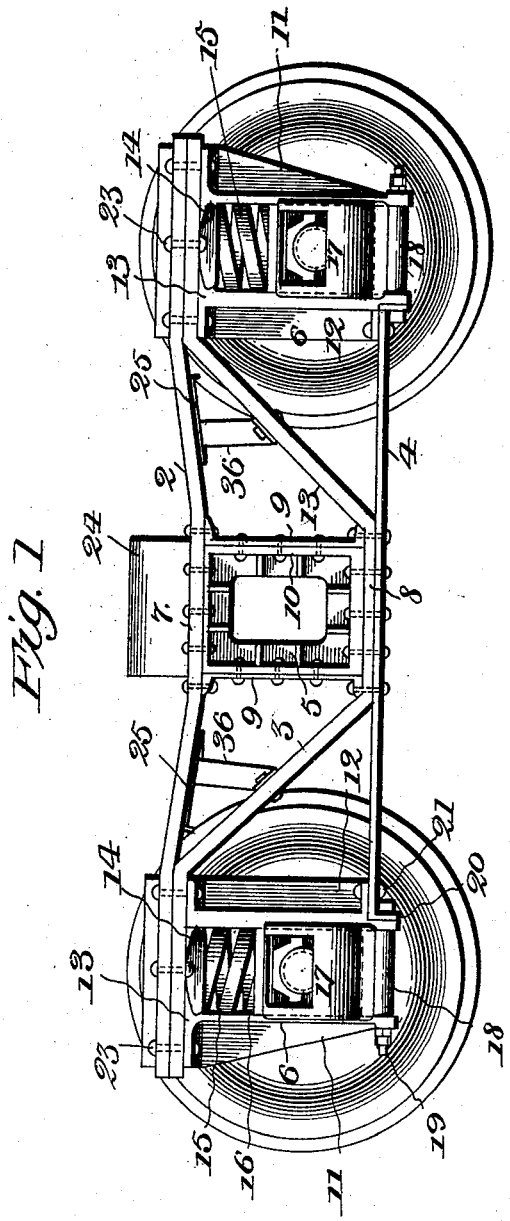
Figure 14:
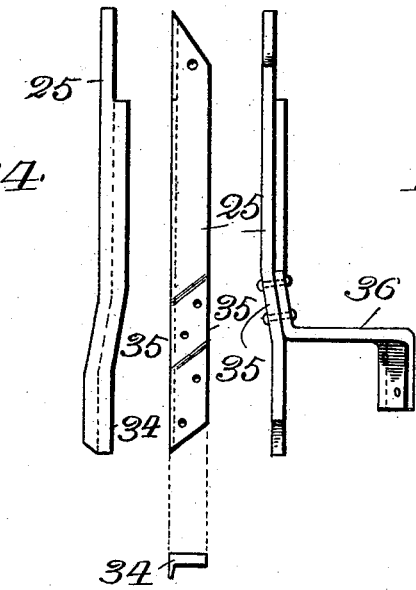
Figure 15:
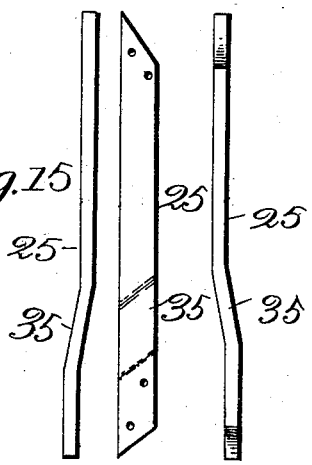
Figure 16:
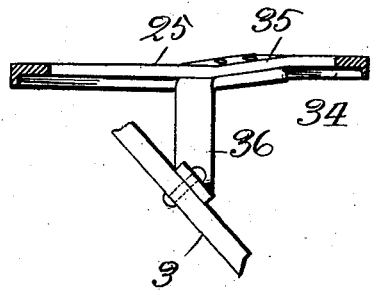
Figure 17:
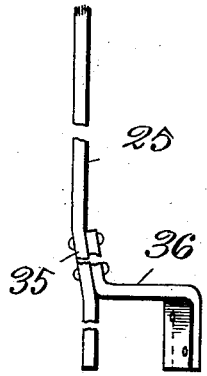
Figure 18:
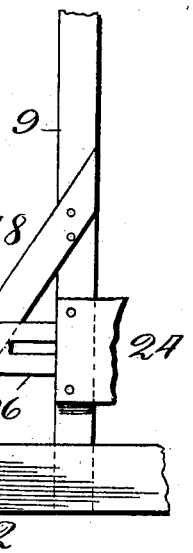
Figure 19:
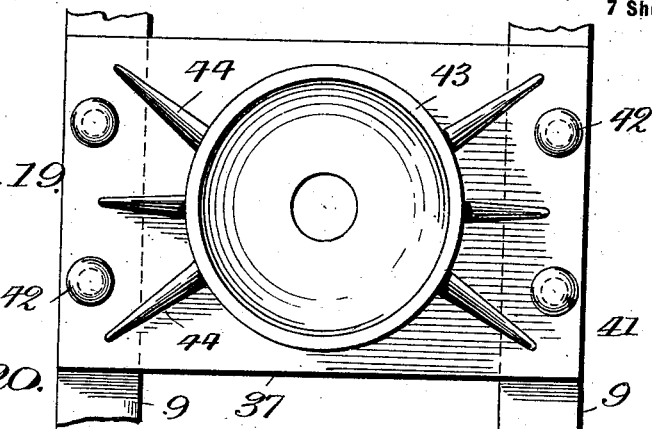
Figure 20:
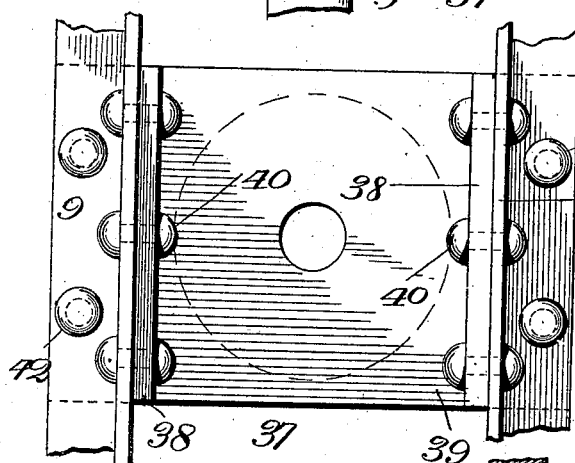
Figure 21:
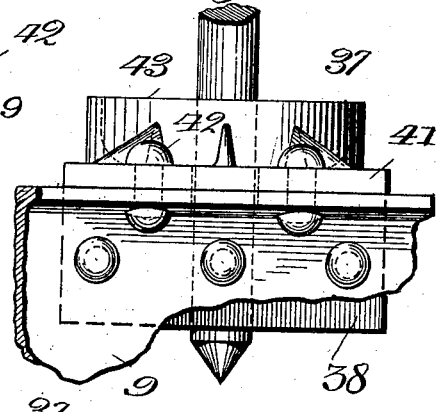
Figure 22:
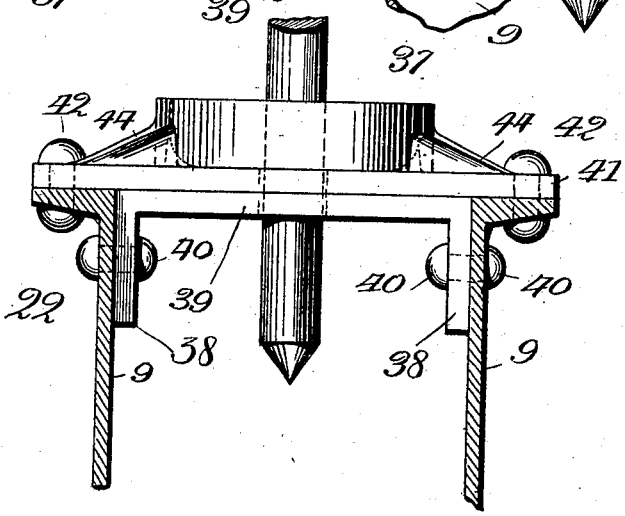

In the accompanying drawings, forming a part of this specification, Figure 1 is a side elevation of my improved truck; Fig. 2, a top plan of the pedestal; Fig. 3, a front elevation of the same; Fig. 4, an end or side elevation of the pedestal; Fig. 5, a detail cross-section on line *a a*, Fig. 4; Fig. 6, a detail vertical section through the journal-box springs; Fig. 7, a horizontal section on the line *b b*, Fig. 9, in the direction of the arrow; Fig. 8, a section on the line *c c*, Fig. 10; Fig. 9, a rear elevation of the pedestal; Fig. 10, a side or end elevation of the pedestal; Fig. 11, a detail front elevation of the transom-casting, showing connecting parts; Fig. 12, a horizontal section on the line *d d*, Fig. 11; Fig. 13, a vertical section on the line *e e*, Fig. 11. Fig. 14 shows an edge and side view of a flanged brace-bar and an edge view of a brace-bar having a knee secured thereto. Fig. 15 shows reverse edge views and a side view of a diagonal brace-bar; Fig. 16, a detail section showing the relation of the knee to the inverted arch-bar; Fig. 17, an edge view of diagonal brace-bar and knee reversed to view of same in Fig. 14; Fig. 18, a detail plan showing arrangement of the brace-bar and side bearings on frame-truck; Fig. 19, a top plan of center-plate; Fig. 20, a bottom plan of the same; Fig. 21, a side elevation of center-plate, showing its connection to transom; Fig. 22, a similar view of center-plate, showing the transom in cross-section; Fig. 23, a vertical section through my improved side bearing with springs in position; Fig. 24, a similar view with springs removed; Fig. 25, an end elevation of the side bearing; Fig. 26, a side elevation in half-section of the side bearing, and Fig. 27 a plan view, in half-section, of the same.

Similar numerals refer to similar parts throughout all the views.

Referring to the drawings, the numeral 2 represents the depressed top arch-bar; 3, the inverted arch-bar; 4, the pedestal tie-bar, and 5 the transom-casting. These parts, with the pedestal 6, form the side frames of the truck. The top arch-bar 2 is bent downwardly from the pedestals at each end toward the center, and its middle section or portion 7 is straight, but on a lower plane than its ends, which are also straight. The inverted arch-bar 3 is formed with straight ends corresponding to the ends of the arch-bar 2, which are bent at an acute angle downwardly toward its center from each end, and has a straight middle section 8, corresponding to the middle section 7 of the arch-bar 2, as clearly shown in Fig. 1. Between the middle sections 7 and 8 of the arch-bars and the transom 9 is securely riveted the transom-casting 5, the latter being formed with a lateral flange 10 at its edge, through which the arch-bars, tie-bar, and transom are riveted to said casting. The transom being channel-shaped, is also riveted at top and bottom to the arch-bar 2 and the inverted arch-bar 3 and the tie-bar 4, respectively, thereby forming an exceedingly strong and simple construction. It will be observed that the side frame described is of such construction that there is nothing practically hidden thereby and that all parts of the truck, including the wheels lying back of the side frames, are open to inspection by the car-inspectors.

The pedestal 6 is formed of a single piece or casting having the inclined vertical flange 11 at one side thereof, as best shown in Figs. 3, 4, and 5, and the straight vertical flange 12 at the other side, as shown in Figs. 8, 9, and 10, and the top or connecting bar 13, which is cast with the crown-plate or cap-bearing 14 for the journal-box springs 15, which are arranged in the pedestal jaw between the pedestal-horns 16 and rest at their lower ends on the journal-box 17. A tubular jaw-bit 18 is secured between the pedestal-horns by a bolt 19, which prevents the spreading or closing of the pedestal-horns. The flange 11 extends from the vertical top flange 13ᵃ of the pedestal in an inclined direction to the center of the lower end of the horn, where it is flattened and an opening formed therein for the insertion of the jaw-bit bolt 19 and gradually decreases in width (see Fig. 3) toward its lower end. Thus the pedestal-horn is greatly strengthened at its upper portion by reason of the thickness or width of metal at that point, and the reduction of its width toward the lower end of the horn greatly reduces the weight without lessening the strength of the pedestal as a whole, since it is braced at the lower end by the tie-bolt and jaw bit and bolt.

As shown in Fig. 1, the tie-bar 4 is formed with downwardly-turned heels 20, through which it is secured to the lower ends of the pedestal by the bolt 19, which secures the jaw-bit in place by a rivet 21, connecting said rod to a horizontal flange on the lower end of the side flange 12; but the side flange 12 may be shortened, if desired, and the heel of the tie-bar riveted directly to the pedestal-horn by a rivet 22, the inner head of which is countersunk in said horn, as shown in Figs. 3 and 9.

The journal-box is arranged in the pedestal in the usual manner and the spring 15 arranged on said box, with its upper end projecting into and bearing against the cap-bearing 14, said spring consisting of three coiled springs of different diameters and graduated as to strength and nested together, as shown in Fig. 6, so that the weight of the car is first received by the inner or weakest spring, as shown, as when the car is running light, the other springs only coming into action as the weight of the car is increased by loading the same.

The pedestal is secured by rivets 23 to the arch-bars 2 and 3.

In order to provide a support for the side truck-bearing 24 and to hold the truck square, (see Figs. 1 and 23 to 27, inclusive,) I secure the lateral or diagonal brace-bars 25 to the arch-bars and transom. These bars are shown in detail in Figs. 14, 15, 16, 17, and 18 and are riveted near each end to the transom 9, and the side bearings are formed with end projections 26, (see Figs. 26 and 27,) which are riveted to the diagonal brace-bars 25. The extended ends of the bearings are of peculiar construction and serve to support therefrom the brake-beam, as described in my application for Letters Patent for an improvement in brakes of even date herewith and need in this connection no further description herein.

The side bearing is formed in the shape of an elongated rectangular box arranged between the transom-bars and having downwardly-extending flanges 27, which are riveted to the webs of said transom-bars by rivets 28 and to the top of the transom by rivets 29 through the horizontal end flanges 30.

In Fig. 26 the side bearing is shown in half-section, with removable cap 31, having square pockets 32 projecting from its under side and adapted to enter between the walls or telescope in the body of the bearing 24 and formed with horizontal flanges 33 to exclude foreign substances from the box 24. Within the box 24 are arranged in nested form the springs 45, which are graduated in length and strength, so that the center springs, which are the weaker of the series, will anticipate the rolling or rocking motion of the car-body and keep the body and truck side bearings in slight contact, while the intermediate coil is adjusted so as to take up the ordinary rocking motion of the car, and the outer coil for the extreme rocking motion to which the car may be subjected.

The diagonal brace-bars 25 are formed either of unflanged bars, as shown in Figs. 15 and 17, or with longitudinal side flanges 34, as shown in Figs. 14 and 16, and are bent, as at 35, so as to extend from the top of the transom at one end to the under side of the arch-bar 2 at the other end, and are provided with knee-pieces 36, which extend to and are riveted to the inverted arch-bar 3, thereby adding strength to both arch-bars.

In Figs. 19, 20, and 22 is shown my improved center plate 37 and the manner of its attachment to the transom 9. The center-plate is cast in one piece with the horizontal flanges 41, through which it is secured by rivets 42 to the top flanges of the transom 9, and the center bearing 43 of the plate is circular in shape and dished, as shown, to receive the male member or car-body center bearing and is reinforced by ribs 44, cast therewith. The body of the center plate, or that portion thereof which is unsupported by the transom-bars, is reinforced by a rolled bracket-iron 39, having its ends 38 bent at right angles and riveted to the transom-bars. The usual center-pin opening is formed in the center-plate and reinforcing-iron 39.

Among the advantages my improved truck possesses is that the wheels and inside-hung brakes may be thoroughly inspected and parts lying between the side frames are readily accessible for repairs when necessary. This feature of my truck is particularly valuable, as a car-inspector is thereby enabled to readily detect in the limited time allowed him for inspection during stops of the train at stations whether or not a wheel is broken or any repairs needed by the underlying parts of the truck.

Having thus described my invention, what I claim as new, and desire to secure by Letters Patent, is—

1. A pedestal for car-trucks consisting of a single casting having a horizontal top flange, a vertical top flange, a central cap-bearing and pedestal-horns, one of which is cast with an inclined vertical flange gradually decreasing in width toward the lower end of the horn and formed with an opening and the other horn having a straight vertical flange.

2. A metal frame for car-trucks comprising a centrally-depressed top arch-bar, a pedestal tie-bar, a transom-casting arranged between said arch-bars and riveted thereto and to the transom, diagonal brace-bars connecting said transom and the arch-bars, and pedestals formed of one piece and riveted to said arch-bars and tie-bar.

3. A metal frame for car-trucks comprising a centrally-depressed top arch-bar, an inverted arch-bar, a transom, a transom-casting, and a tie-bar, all riveted together, pedestals formed in one piece and having integral cap-bearings, riveted to said arch-bars and connected by said tie-bar, and a tubular jaw-bit bolted in the pedestal-jaw mouth.

4. The combination, with the transom, of a cast center plate riveted to the top of the transom, and a reinforcing-iron of rolled metal having its ends bent at right angles interposed between the transom-bars and riveted thereto and forming a support for the center plate from side to side of the transom-bars and stiffening the latter.

5. A side bearing for car-trucks comprising a metal box having vertical bottom flanges, horizontal end flanges, a cap having pockets cast therewith, and a series of graduated springs in nested form, adapted to rest in said box and to be inclosed by said pockets.

In testimony whereof I affix my signature in presence of two witnesses.

JOHN S. FRANCIS.

Witnesses:
H. M. STERLING,
MARIE SPELLMAN.